United States Patent

Tu

(10) Patent No.: US 9,430,239 B2
(45) Date of Patent: Aug. 30, 2016

(54) CONFIGURABLE MULTICORE NETWORK PROCESSOR

(71) Applicant: QUALCOMM Incorporated, San Diego, CA (US)

(72) Inventor: Yifeng Tu, Santa Clara, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 538 days.

(21) Appl. No.: 13/797,838

(22) Filed: Mar. 12, 2013

(65) Prior Publication Data

US 2014/0281385 A1  Sep. 18, 2014

(51) Int. Cl.
*G06F 9/38*  (2006.01)
*H04L 12/861*  (2013.01)
*H04L 12/933*  (2013.01)

(52) U.S. Cl.
CPC ............. *G06F 9/38* (2013.01); *G06F 9/3885* (2013.01); *G06F 9/3887* (2013.01); *G06F 9/3889* (2013.01); *H04L 49/1546* (2013.01); *H04L 49/90* (2013.01)

(58) Field of Classification Search
None
See application file for complete search history.

(56) References Cited

U.S. PATENT DOCUMENTS

| | | | | |
|---|---|---|---|---|
| 4,811,210 A * | 3/1989 | McAulay | ................ | G06E 1/02 385/17 |
| 6,128,720 A * | 10/2000 | Pechanek et al. | ............. | 712/20 |
| 6,272,616 B1 | 8/2001 | Fernando et al. | | |
| 6,789,167 B2 | 9/2004 | Naffziger | | |
| 6,883,084 B1 * | 4/2005 | Donohoe | ........................ | 712/1 |
| 7,340,585 B1 * | 3/2008 | Ganesan | ............. | G06F 15/7867 712/15 |
| 8,055,880 B2 * | 11/2011 | Fujisawa | ............... | G06F 9/3885 712/15 |
| 8,099,583 B2 * | 1/2012 | Wang | .................. | G06F 9/30145 712/11 |
| 2003/0128050 A1 * | 7/2003 | Schultz | .......................... | 326/41 |
| 2005/0040850 A1 * | 2/2005 | Schultz | ............. | G06F 15/7867 326/41 |
| 2006/0004992 A1 * | 1/2006 | Fujisawa | ............... | G06F 9/3885 712/226 |
| 2006/0114831 A1 | 6/2006 | Buduma et al. | | |
| 2009/0128189 A1 * | 5/2009 | Madurawe et al. | ............ | 326/41 |
| 2009/0285228 A1 | 11/2009 | Bagepalli et al. | | |
| 2010/0013517 A1 * | 1/2010 | Manohar et al. | ............... | 326/38 |
| 2010/0042785 A1 | 2/2010 | Hass et al. | | |
| 2011/0238948 A1 | 9/2011 | Vorbach et al. | | |
| 2012/0177047 A1 | 7/2012 | Roitshtein | | |
| 2015/0310311 A1 * | 10/2015 | Shi | ...................... | G06F 15/8023 382/158 |

FOREIGN PATENT DOCUMENTS

WO       0239260 A2    5/2002

OTHER PUBLICATIONS

'The Promise of High-Performance Reconfigurable Computing' by Tarek El-Ghazawi et al., copyright 2008, IEEE.*
'A Decade of Reconfigurable Computing: a Visionary Retrospective' by Reiner Hartenstein, copyright 2001, IEEE.*
Open Flow Switch Specification; Version 1.3.0 ( Wire Protocol 0x04 ), Jun. 25, 2012.

(Continued)

*Primary Examiner* — Steven Snyder
(74) *Attorney, Agent, or Firm* — Arent Fox LLP

(57) ABSTRACT

A network processor includes a plurality of processing cores configured to process data packets, and a processing mode mechanism configurable to configure the processing cores between a pipeline processing mode and a parallel processing mode. The processing mode mechanism may include switch elements, or a fabric logic and a bus, configurable to interconnect the processing cores to operate in either the pipeline processing mode or the parallel processing mode.

14 Claims, 7 Drawing Sheets

(56) References Cited

OTHER PUBLICATIONS

International Search Report and Written Opinion—PCT/US2014/023395—ISA/EPO—Nov. 3, 2014.
O'Driscoll S et al., "Adaptive resolution ADC array for neural implant", Proceedings of the 31st Annual International Conference of the IEEE Engineering in Medicine and Biology Society: Engineering the Future of Biomedicine. EMBC 2009, IEEE, Sep. 3, 2009, pp. 1053-1056, XP031882754, DOI: 10.1109/IEMBS.2009.5335410,ISBN: 978-1-4244-3296-7.

* cited by examiner

CONFIGURABLE MULTICORE NETWORK PROCESSOR

BACKGROUND

1. Field

The present disclosure relates generally to electronic circuits, and more particularly, to network processors with multiple processing cores configurable between pipeline processing modes and parallel processing modes.

2. Background

Packet switched networks are widely used to transmit information between individuals and organizations. In packet switched networks, small blocks of information, or data packets, are transmitted over a common channel. More specifically, the information is segmented into multiple data packets at the origin and routed to the destination over the channel using an address scheme. At the destination, the information is reconstructed from the data packets.

Many devices on a network include a network processor designed to process data packets. A network processor is a software programmable device that may employ multiple processing cores. The processing cores may be dedicated in parallel, so that each data packet received by the network processor is assigned to a processing core which performs all the necessary processing on the data packet. Alternatively, the processing cores may be dedicated in a pipeline fashion, with each processing core in the pipeline dedicated to a running a specific sub-task on the data packet. Each configuration has its own advantages and disadvantages in networking applications. For example, layer 2 and layer 3 network protocols are well suited for pipelined processing, but higher layer protocols like deep packet inspection (DPI) are better suited for parallel processing. Accordingly, there is a need in the art for a single solution which efficiently supports all network protocols e.g., all layer network protocols.

SUMMARY

A network processor is disclosed. The network processor includes a plurality of processing cores configured to process data packets, and a processing mode mechanism configurable to configure the processing cores between a pipeline processing mode and a parallel processing mode. The network processor may also include a plurality of first-in-first-out (FIFO) interfaces arranged with the processing cores. The processing mode mechanism is configured to interconnect the FIFO interfaces and the processing cores to operate in either the pipeline processing mode or the parallel processing mode. The processing mode mechanism may comprise a plurality of switch elements, e.g., switches, multiplexers, etc., configurable to interconnect the processing cores to operate in either the pipeline processing mode or the parallel processing mode. The processing mode mechanism may also comprise a fabric logic and bus configurable to interconnect the processing cores to operate in either the pipeline processing mode or the parallel processing mode.

Another network processor is disclosed. The network processor includes means for processing data packets, and means for configuring the means for processing between a pipeline processing mode and a parallel processing mode. The network processor may further include a plurality of FIFO interfaces arranged with the means for processing. The means for configuring is configured to interconnect the FIFO interfaces and the means for processing to operate in either the pipeline processing mode or the parallel processing mode. The means for processing may include a plurality of processing cores, and the means for configuring may include a plurality of switch elements, or a fabric logic and bus, configurable to interconnect the processing cores to operate in either the pipeline processing mode or the parallel processing mode.

A method of processing data packets is disclosed. The method includes configuring a plurality of processing cores in a selected processing mode, the selected processing mode being one of a pipeline processing mode and a parallel processing mode. The method also includes distributing data packets to the plurality of processing cores in accordance with the selected processing mode, and receiving one or more data packets from one or more of the plurality of processing cores in accordance with the configured processing mode. Configuring the plurality of processing cores may include configuring a plurality of switch elements to interconnect the processing cores to operate in either the pipeline processing mode or the parallel processing mode, or configuring a fabric logic and bus to interconnect the processing cores to operate in either the pipeline processing mode or the parallel processing mode.

A computer program product is disclosed. The computer program product includes a computer-readable medium comprising code executable by a network processor. The network processor includes a plurality of processing cores and a processing mode mechanism. The code when executed in the network processor causes the network processor to configure a plurality of processing cores in a selected processing mode. The selected processing mode can be one of a pipeline processing mode and a parallel processing mode. The code also causes the network processor to distribute data packets to the plurality of processing cores in accordance with the selected processing mode, and receive one or more data packets from one or more of the plurality of processing cores in accordance with the configured processing mode.

Another network processor is disclosed. The network processor includes a plurality of processing cores configured to process data packets, wherein the processing cores are configurable between a pipeline processing mode and a parallel processing mode. The network processor may comprise a plurality of switches configured to interconnect the processing cores to operate in either the pipeline processing mode or the parallel processing mode. The network processor may comprise memory and a memory bus to provide the processing cores access to the memory, wherein the memory bus interconnects the processing cores to operate in either the pipeline processing mode or the parallel processing mode.

It is understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses and methods will now be presented in the detailed description by way of example, and not by way of limitation, with reference to the accompanying drawings, wherein.

DETAILED DESCRIPTION

Figure 1:
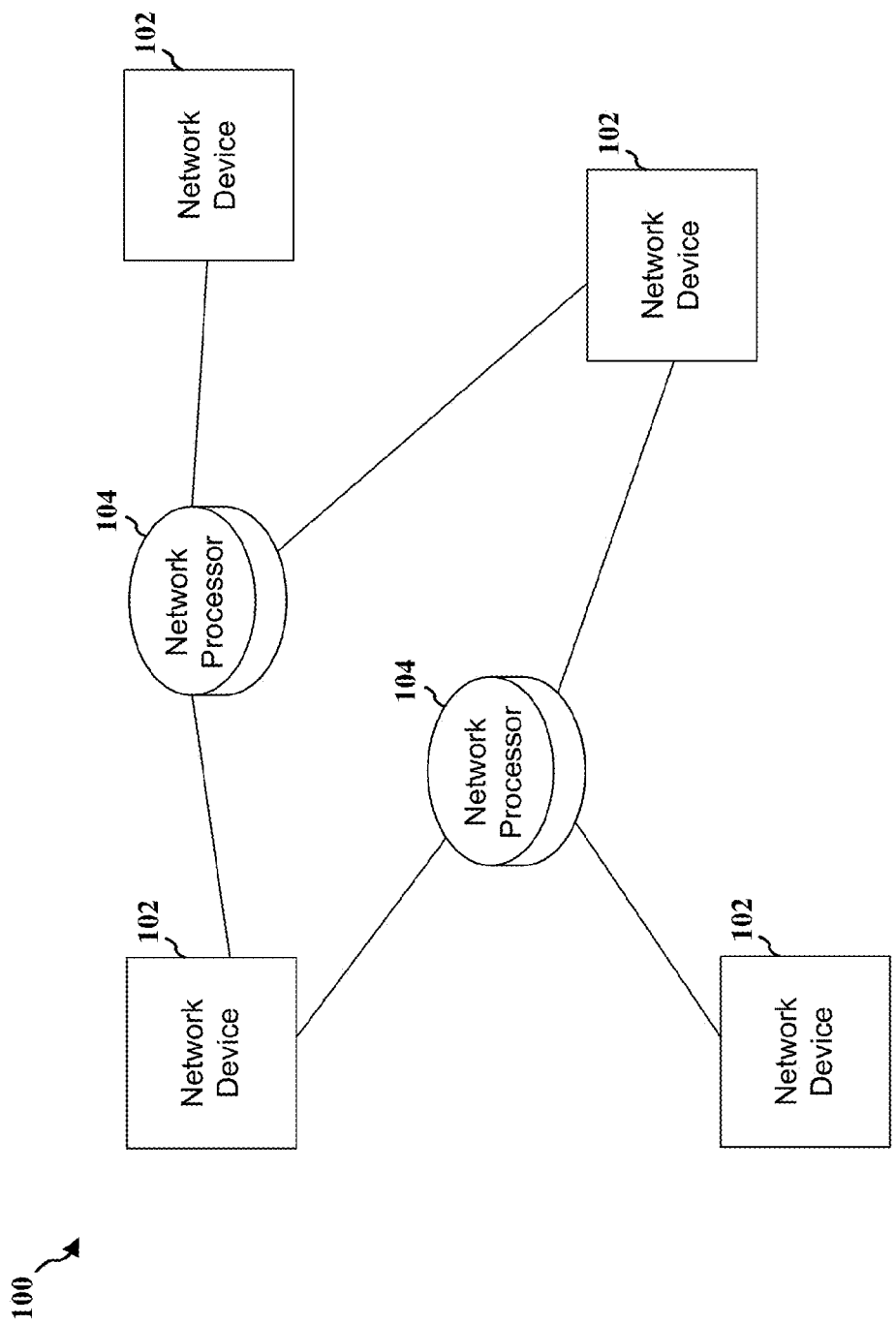
FIG. 1 is a conceptual block diagram illustrating an example of a telecommunications system.

Various aspects of the disclosure will be described more fully hereinafter with reference to the accompanying drawings. This disclosure may, however, be embodied in many different forms by those skilled in the art and should not be construed as limited to any specific structure or function presented herein. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of this disclosure, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure and/or functionality in addition to or instead of other aspects of this disclosure. It should be understood that any aspect of the disclosure disclosed herein may be embodied by one or more elements of a claim.

Although particular aspects will be described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different circuits, technologies, systems, networks, and methods, some of which are illustrated by way of example in the drawings and in the following description. The detailed description and drawings are merely illustrative of the disclosure rather than limiting, the scope of the disclosure being defined by the appended claims and equivalents thereof.

Various concepts will be described more fully hereinafter with reference to the accompanying drawings. These concepts may, however, be embodied in many different forms by those skilled in the art and should not be construed as limited to any specific structure or function presented herein. Rather, these concepts are provided so that this disclosure will be thorough and complete, and will fully convey the scope of these concepts to those skilled in the art. The detailed description may include specific details However, it will be apparent to those skilled in the art that these concepts may be practiced without these specific details. In some instances, well known structures and components are shown in block diagram form in order to avoid obscuring the various concepts presented throughout this disclosure.

The various concepts presented throughout this disclosure are well suited for implementation in a network element. A network element (e.g., a router, switch, bridge, or similar networking device.) includes any networking equipment that communicatively interconnects other equipment on the network (e.g., other network elements, end stations, or similar networking devices).

These concepts may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

The present disclosure is directed to a network processor having multiple processing cores that may be configurable between a pipeline processing mode and a parallel processing mode. In the pipeline processing mode, the software operation for a data packet is divided into multiple software operations or subtasks, with each subtask being run on a separate processing core. The intermediate processing of the data packet obtained by any one processing core may be passed in the next stage of the pipeline processing. In the parallel processing mode, each data packet is assigned to a processing core. Each processing core runs the same software and processes the data packet to completion.

FIG. 1 is a conceptual block diagram illustrating an example of a packet-based network 100. The network 100 interconnects multiple network devices 102, e.g., computers, using one or more network processors 104. The network 100 may be a wide area network (WAN) such as the Internet, a local area network (LAN) such as an Ethernet network, or any other suitable network. The packet-based network 100 may be configured to cover any suitable region, including global, national, regional, municipal, or within a facility, or any other suitable region.

A network processor 104 may be a switch, a router, a bridge, or any other suitable device that interconnects other equipment on the network 100. The network processors 104 may be implemented as a programmable device that includes one or more lookup tables that are used to direct data packets through the network. Each lookup table includes one or more flow table entries. Each flow entry is used to process data packets.

Figure 2:
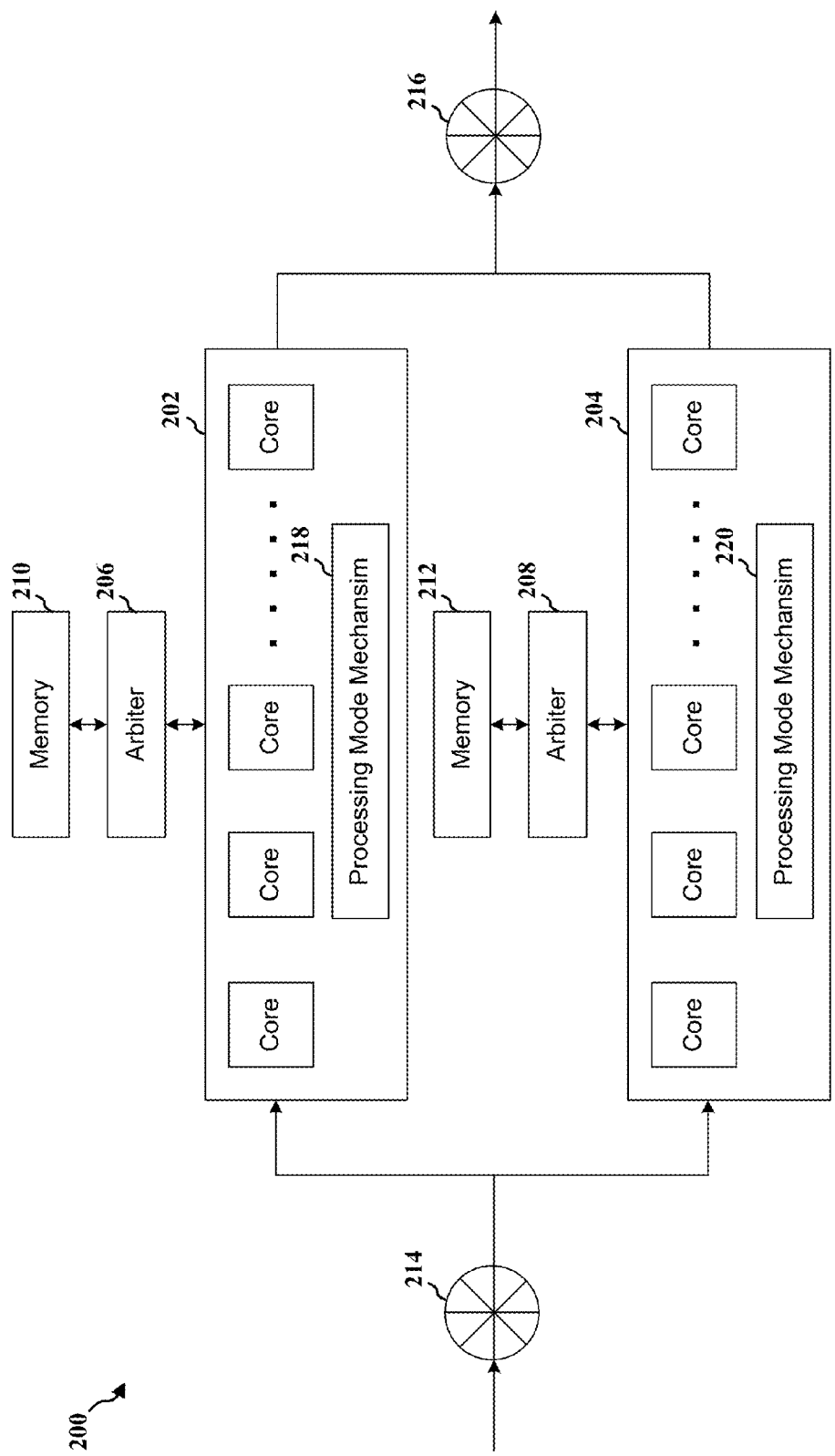
FIG. 2 is a block diagram of a configurable multicore network processor.

FIG. 2 is a general block diagram of a configurable multicore network processor 200. The network processor 200 has a first core group 202 and a second core group 204. Each core group 202, 204 includes a number of processing cores configured to process data packets. A processing core may include one or more of firmware and dedicated memory for storing code local to the core. Each core group 202, 204 may also include a number of FIFO interfaces (not shown) that are associated with the processing cores.

A processing mode mechanism 218, 220 is associated with each core group 202, 204. The processing mode mechanism 218, 220 may include one or more of switches and multiplexers, or a fabric logic and a bus. The processing mode mechanism 218, 220 is configurable to arrange processing cores between a pipeline processing mode and a parallel processing mode. In a pipeline arrangement or mode, a software task is divided into multiple sub tasks, and each task runs on a separate processing core. The intermediate processing information obtained by any core may be passed to the next stage in the pipeline processing. In a parallel mode, any task can be run in any core at the control of an operating system (OS) scheduler. The OS scheduler provides load balance among multiple processing cores. Alternatively, in a parallel mode, a task can be bound to a specific core using CPU affinity mechanisms. Although separate processing mode mechanisms 218, 220 are shown for each core group 202, 204, a single mechanism may be used to configure the processing cores for both core groups.

Associated with each core group is a memory arbiter 206, 208. The arbiter 206, 208 functions as an interface to memory 210, 212 and manages access to the memory. For example, the arbiter 206, 208 may be configured to manage access to the memory by the processing cores. The arbiter 206, 208 may determine the sequence in which the commands, and associated program instructions and data, stored in memory are provided to the processing cores. The arbiter 206, 208 may grant access to memory 210, 212 over a bus.

The memory 210, 212 may be external to the multicore network processor 200 and include one or more shared static random access memory (SRAM) banks and ternary content addressable memory (TCAM) banks. The memory 210, 212 may store one or more of program code, lookup tables, packet data and queue information.

The multicore network processor 200 further includes a dispatcher 214 and a reassemble 216. The dispatcher 214 is configured to distribute data packets received from a switch core to the processing cores in accordance with the operation mode of the multicore network processor 200. The reassembler 216 is configured to receive data packets from the processing cores and to assembler or reorder the data packets in accordance with the operation mode of the multicore network processor 200. The reassembler 216 may be referred to as a reorder module.

Figure 3:
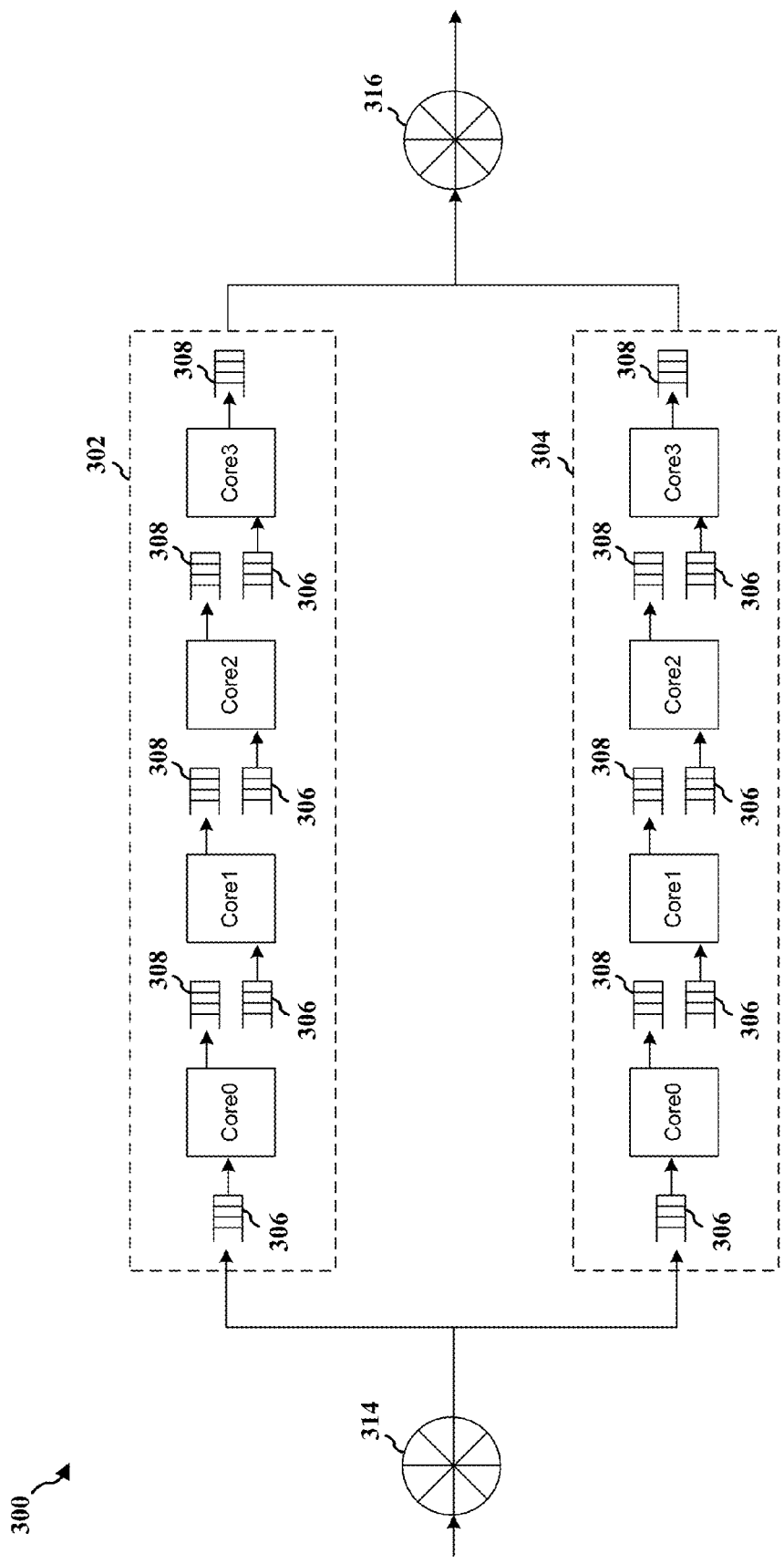
FIG. 3 is a block diagram of a configurable multicore network processor in a pipeline processing mode.

Pipeline Processing Mode:

FIG. 3 is a block diagram of an example multicore network processor 300 configured to operate in a pipeline processing mode. The example multicore network processor 300 includes a first pipeline 302 having four processing cores and a second pipeline 304 having four processing cores (more or less processing cores may be included in the pipelines 302, 304). Each processing core has an input FIFO interface 306 for moving packets into the processing core and an output FIFO interface 308 for moving packets out of the processing core.

The firmware running a first processing core 310 processes the incoming packets by reading from the input FIFO interface 306 associated with that processing core. When the processing core 310 completes processing of the incoming packet, the firmware of the core outputs an intermediate packet on the output FIFO interface 308 associated with the core. An "intermediate packet" refers to a packet output by a core processor, which results from the processing—by that processing core—of a packet input to the processing core. The intermediate packet is input to the input FIFO interface 306 of the next processing core and processed in accordance with the firmware of that processing core. The processing and forwarding of intermediate packets continues until a final packet is output by the last processing core in the pipeline.

The dispatcher 314 may distribute packets into the two pipelines 302, 304. The dispatcher 314 may apply different distribution algorithms. In a round-robin distribution, the packet dispatcher 314 distributes packets alternatively. If the first input FIFO interface 306 in the first pipeline 302 is not sufficient to hold a packet, the dispatcher 314 may distribute the packet to the first input FIFO interface 306 of the second pipeline 304. If the first input FIFO interfaces 306 of both pipelines 302, 304 are not sufficient to hold the packet the dispatcher 314 may stall further distribution of the packets. In a hash based distribution, the packet dispatcher 314 applies a certain algorithm based on packet header fields or other fields, and applies a modulo operation to get an index to either one of the two pipelines 302, 304.

The dispatcher 314 may also assign a sequence number to packets, and the reorder module 316 may retrieve the packet in the same order as the packet is distributed into the pipeline. To facilitate the reordering task, the sequence number may be the first 16-bit field going into the FIFO.

Figure 4:
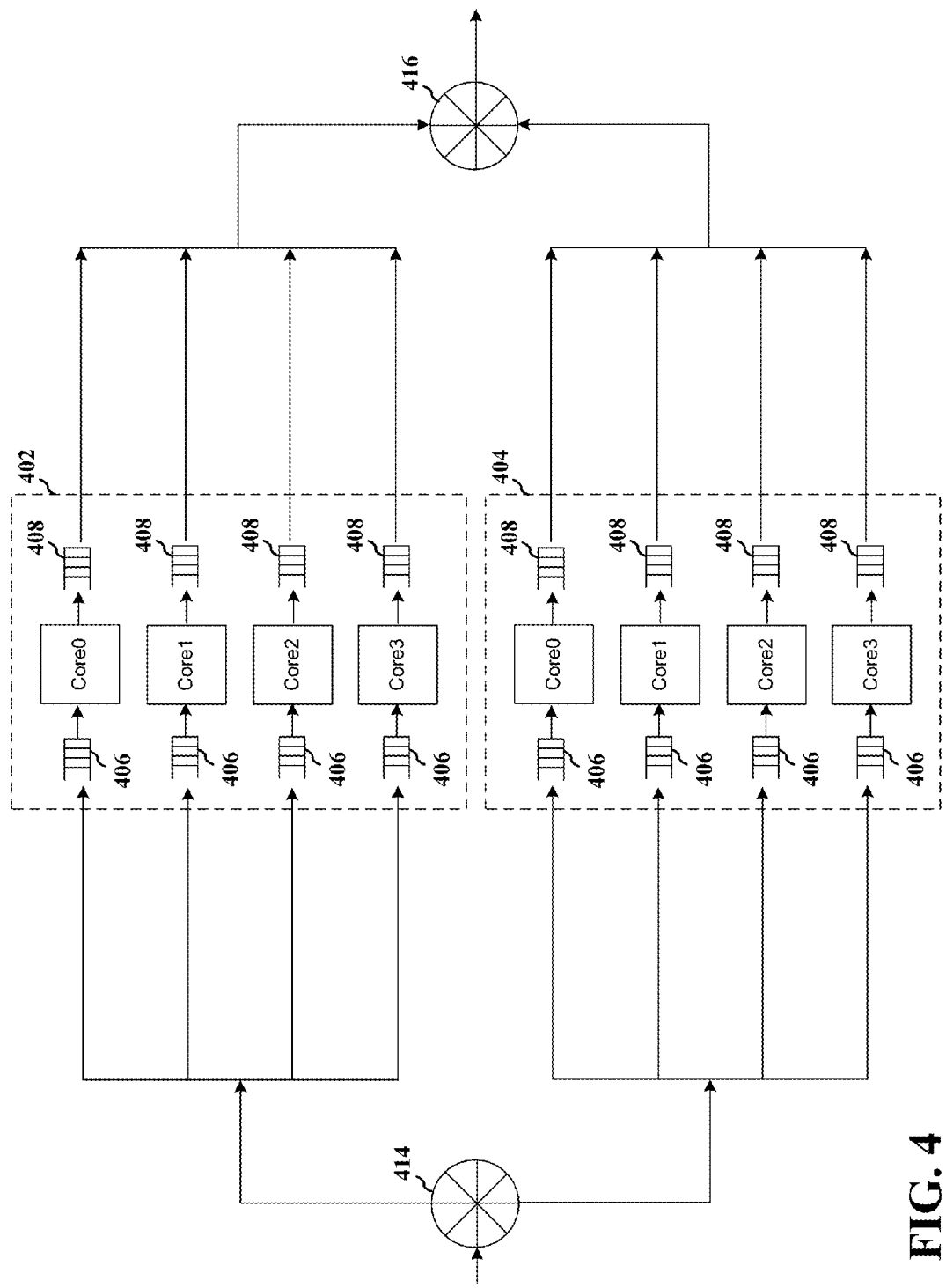
FIG. 4 is a block diagram of a configurable multicore network processor in a parallel processing mode.

Parallel Processing Mode:

FIG. 4 is a block diagram of an example multicore network processor 400 configured to operate in a parallel processing mode. The example multicore network processor 400 includes a first processor group 402 having four processing cores and a second processor group 404 having four processing cores (more or less processing cores may be included in the groups 402, 404). Each processing core has an input FIFO interface 406 and an output FIFO interface 408. The firmware running a processing core processes incoming packets by reading from the input FIFO interface 406 associated with that processing core. When the processing core completes processing of the incoming packet, the firmware of the core outputs the processed packet on the output FIFO interface 408 associated with the core. In the parallel processing mode, each processing core may run the same software and process a packet until completion.

The dispatcher 414 may distribute packets into the two processor groups 402, 404. The dispatcher 414 may apply different distribution algorithms. In a round-robin distribution, the packet dispatcher 414 distributes packets alternatively. If one of the input FIFO interfaces 406 in the first processor group 402 is not sufficient to hold a packet, the dispatcher 414 may distribute the packet to one of the input FIFO interfaces 406 of the second processor group 404. If the input FIFO interfaces 406 of both groups 402, 404 are not sufficient to hold the packet the dispatcher 414 may stall further distribution of the packets. In a hash based distribution, the packet dispatcher 414 applies a certain algorithm based on packet header fields or other fields, and applies a modulo operation to get an index to either one of the two groups 402, 404.

The dispatcher 414 may also assign a sequence number to packets, and the reorder module 416 retrieves the packet in the same order as the packet is distributed into the pipeline. To facilitate the reordering task, the sequence number may be the first 16-bit field going into the FIFO.

Figure 5:
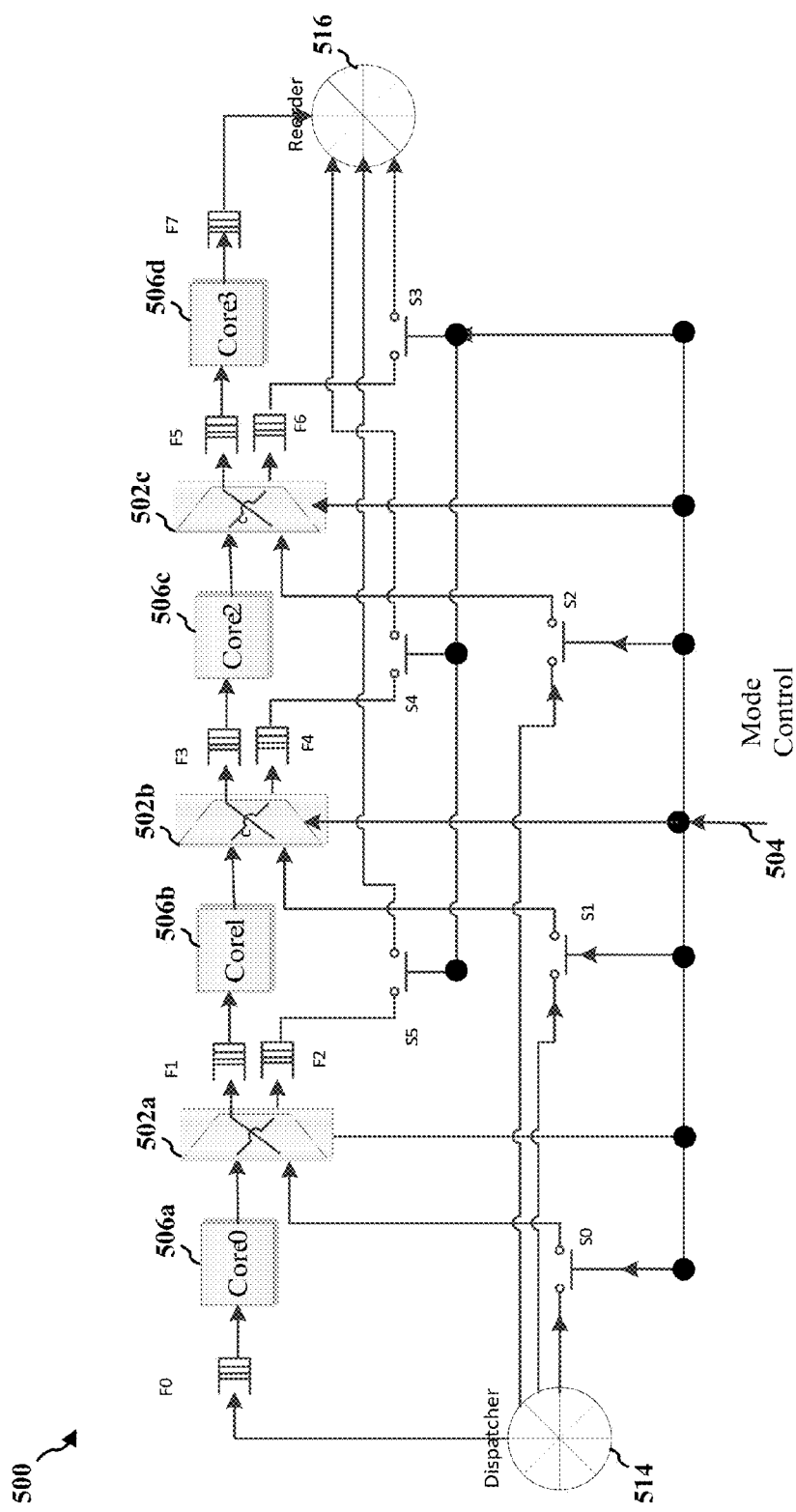
FIG. 5 is a block diagram of a processing mode mechanism for configuring a multicore network processor between a pipeline processing mode and a parallel processing mode.

Processing Mode Selection:

FIG. 5 is a block diagram of a processing mode mechanism 500 that provides for selection of a processing mode for a number of processing cores. The processing mode mechanism 500 provides a means for configuring a number of processing cores in either of a pipeline processing mode or a parallel processing mode. The processing mode mechanism 500, or means for configuring a plurality of processing cores, may include a number of switch elements such as, e.g., switches S0-S5 and/or multiplexers 502*a*-502*c*. Each of the switches S0-S5 and multiplexers 502 may be controlled by a mode control signal 504.

The processing mode mechanism 500 configures the processing cores in a pipeline processing mode when the mode control signal 504 sets switches S0-S5 to an open state, and sets the multiplexers 502*a*-502*c* to direct core output packets to the upper FIFO interfaces F1, F3, F5, F7. In this mode, the dispatcher 514, or means for distributing data packets, distributes a packet to the FIFO interface F0.

The processing cores, or means for processing data packets, in conjunction with switch elements of the processing mode mechanism 500, may process the distributed packet as follows: The distributed packet is processed by the first processing core 506*a*. The first multiplexer 502*a* receives the resultant, intermediate packet output by the first processing core 506*a* and directs it to the FIFO interface F1. The intermediate packet is processed by the second processing core 506*b*. The second multiplexer 502*b* receives the resultant, intermediate packet output by the second processing core 506*b* and directs it to the FIFO interface F3. This processing sequence continues until the fourth processor core 506*d* outputs a final packet to the last FIFO interface F7. The reorder module 516 receives the final packet from the last FIFO interface F7. In the pipeline mode, the lower FIFO interfaces F2, F4, F6 are not used.

The processing mode mechanism 500 configures the processing cores in a parallel processing mode when the mode control signal 504 sets the switches S0-S5 to a closed state, and sets the multiplexers 502*a*-502*c* to direct dispatcher 514 input packets to the upper FIFO interfaces F1, F3, F5, and to direct processing core output packets to the lower FIFO interfaces F2, F4, F6, F7. In the parallel processing mode, both the upper and lower FIFO interfaces F0-F7 are used.

In the parallel processing mode, the dispatcher 514, or means for distributing data packets, in conjunction with the switch elements of the processing mode mechanism, distributes packets to the processing cores as follows: packets for the first processing core 506*a* are input to the FIFO interface F0, packets for the second processing core 506*b* are input to the FIFO interface F1 through the first multiplexer 502*a*, packets for the third processing core 506*c* are input to the FIFO interface F3 through the second multiplexer 502*b*, packets for the fourth processing core 506*d* are input to the FIFO interface F5 through the third multiplexer 502*c*.

Each of the processing cores processes its respective packet and the processing mode mechanism 500, including multiplexer 502*a*-502*c*, directs the processing core output traffic as follows: the output of the first processing core 506*a* is input to the FIFO interface F2, the output of the second processing core 506*b* is input to the FIFO interface F4, and the output of the third processing core 506*c* is input to the FIFO interface F6. The reorder module 516 collects packets from the FIFO interfaces F2, F4, F6 and F7.

Figure 6:
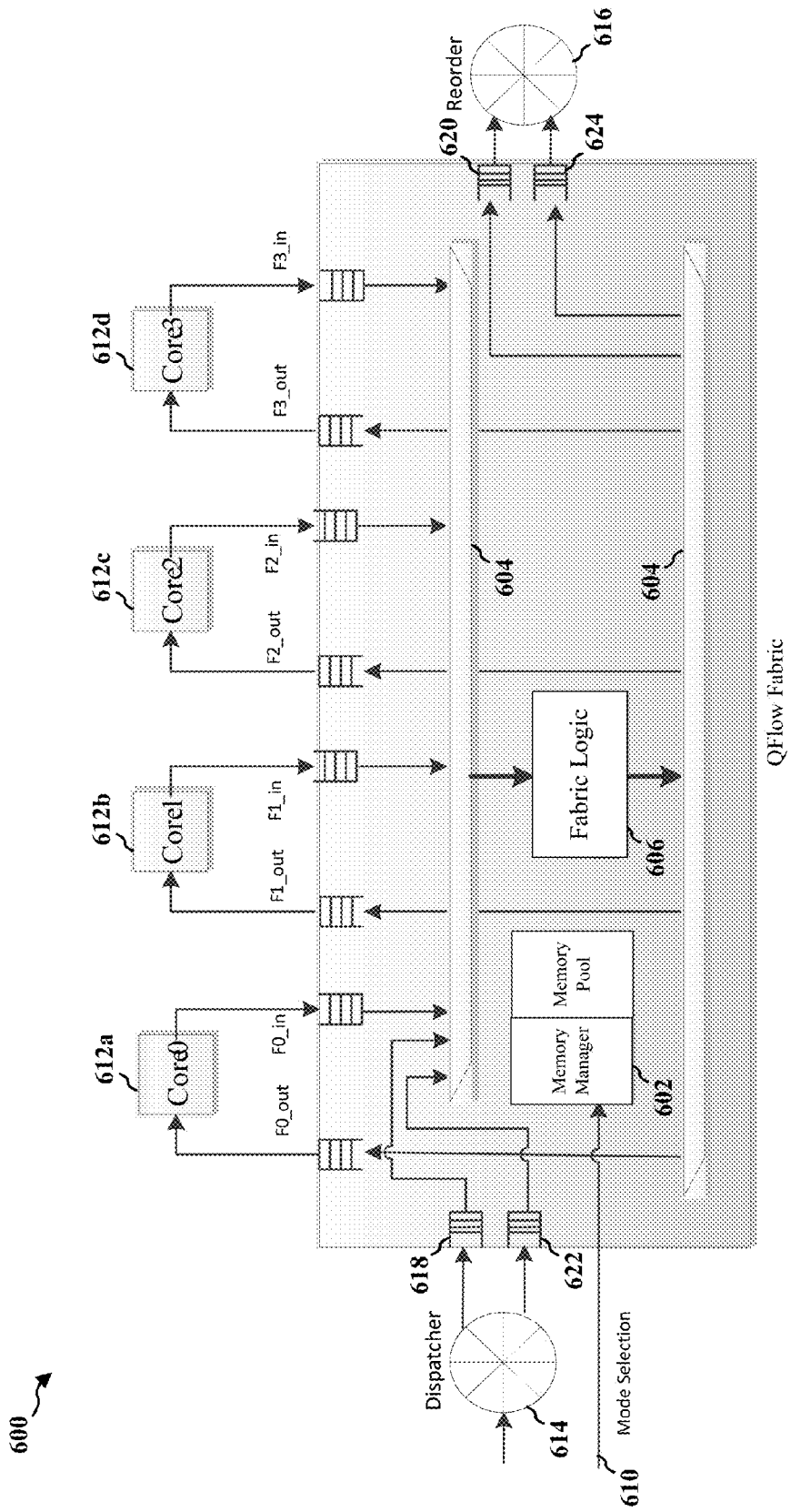
FIG. 6 is a block diagram of another processing mode mechanism for configuring a multicore network processor between a pipeline processing mode and a parallel processing mode.

FIG. 6 is a block diagram of another example processing mode mechanism 600 that provides for selection of a processing mode for a number of processing cores. The processing mode mechanism 600 provides a means for configuring a number of processing cores in either of a pipeline processing mode or a parallel processing mode. The processing mode mechanism 600, or means for configuring a plurality of processing cores, may include a memory 602, a bus 604, and fabric logic 606.

In some embodiments, the processing mode mechanism 600 may function as follows. Each processing core 612*a*-612*d* and reorder module 616 is associated with an ID. Each packet dispatched into the processing mode mechanism 600 by the dispatcher 614 has an ID in the packet header field corresponding to one of the cores or the reorder module. This ID indicates to the fabric logic 606 of the processing mode mechanism 600 where to send the packet. A mode selection signal 610 controls the allocation of FIFO interfaces among the processing cores 612*a*-612*d*, the dispatcher 614 and the reorder module 616.

The processing mode mechanism 600 configures the processing cores in a pipeline processing mode through the mode selection signal 610. In the pipeline processing mode, the dispatcher 614 inputs a packet having an ID corresponding to the first processing core 612*a* into a first fabric input FIFO 618. The packet passes through the bus 604 and is received by the fabric logic 606. Based on the packet ID, the fabric logic 606 sends the packet through the bus 604 to the FIFO interface F0_out of the first processing core 612*a* (Core0).

The first processing core 612*a* processes the packet; changes the packet ID to correspond to the ID of the second processing core 612*b* (Core1); and inputs the packet to the FIFO interface F0_in. The packet passes through the bus 604 and is received by the fabric logic 606. Based on the packet ID, the fabric logic 606 sends the packet to the FIFO interface F1_out of the second processing core 612*b*.

The second processing core 612*b* processes the packet; changes the packet ID to correspond to the ID of the third processing core 612*c* (Core2); and inputs the packet to the FIFO interface F1_in. The packet is then received by the fabric logic 606. Based on the packet ID, the fabric logic 606 sends the packet to the FIFO interface F2_out of the third processing core 612*c*.

The third processing core 612*c* processes the packet; changes the packet ID to correspond to the ID of the fourth processing core 612*d* (Core3); and inputs the packet to the FIFO interface F2_in. The packet is then received by the fabric logic 606. Based on the packet ID, the fabric logic 606 sends the packet to the FIFO interface F3_out of the fourth processing core 612*d*.

The fourth processing core 612*d* processes the packet; changes the packet ID to correspond to the ID of the reorder module 616; and inputs the packet to the FIFO interface F3_in. The packet is then received by the fabric logic 606. Based on the packet ID, the fabric logic 606 sends the packet to the reorder module 616 through a first fabric output FIFO 620.

For the pipeline mode, the number of fabric input FIFO interfaces 618 associated with the dispatcher module and the number of fabric output FIFO interfaces 620 associated with the reorder module 616 may be equivalent to the number of pipelines. For example, in the pipeline just described, the four processing cores form a single pipeline, therefore only a single fabric input FIFO interface 618 is associated with the dispatcher 614 and a single fabric output FIFO interface 620 is associated with the reorder module 616. In another configuration, the four processing cores 612a-612d may define two separate pipelines, each with two cores. In this case, there would be two fabric input FIFO interfaces 618, 622 associated with the dispatcher 614 and two fabric output FIFO interface 620, 624 associated with the reorder module 616.

The processing mode mechanism 600 configures the processing cores in a parallel processing mode through the mode selection signal 610. In a parallel processing mode, the dispatcher 614, or means for distributing data packets, inputs a first packet to a first fabric input FIFO interface 618 having an ID corresponding to the first processing core 612a (Core0), a second packet to a second fabric input FIFO 622 having an ID corresponding to the second processing core 612b (Core1), a third packet to a third fabric input FIFO interface (not shown) having an ID corresponding to the third processing core 612c (Core3), and a fourth packet to a fourth fabric input FIFO interface (not shown) having an ID corresponding to the fourth processing core 612d (Core4).

The fabric logic 606 receives each of the packets over the bus 604. Based on the respective packet IDs, the fabric logic 606 sends each packet to a corresponding FIFO interface F0_out, F1_out, F2_out, and F3_out. Each of the processing cores 612a-612d process its respective packet; changes the packet ID of its packet to correspond to the ID of the reorder module 616; and outputs the its packet to its corresponding FIFO interface F0_in, F1_in, F2_in, and F3_in. The fabric logic 606 receives the packets and sends the packets to the reorder module 616 through a corresponding fabric out FIFO interface 620, 624.

For a parallel processing mode, the number of fabric input FIFO interfaces 618, 622 associated with the dispatcher and the number of fabric output FIFO interfaces 620, 624 associated with the reorder module may be equivalent to the number of processing cores 612a-612d. For example, in the multicore network processor just described, although only two of each type of FIFO interface are illustrated in FIG. 6, there are four fabric input FIFO interfaces and four fabric output FIFO interfaces.

Figure 7:
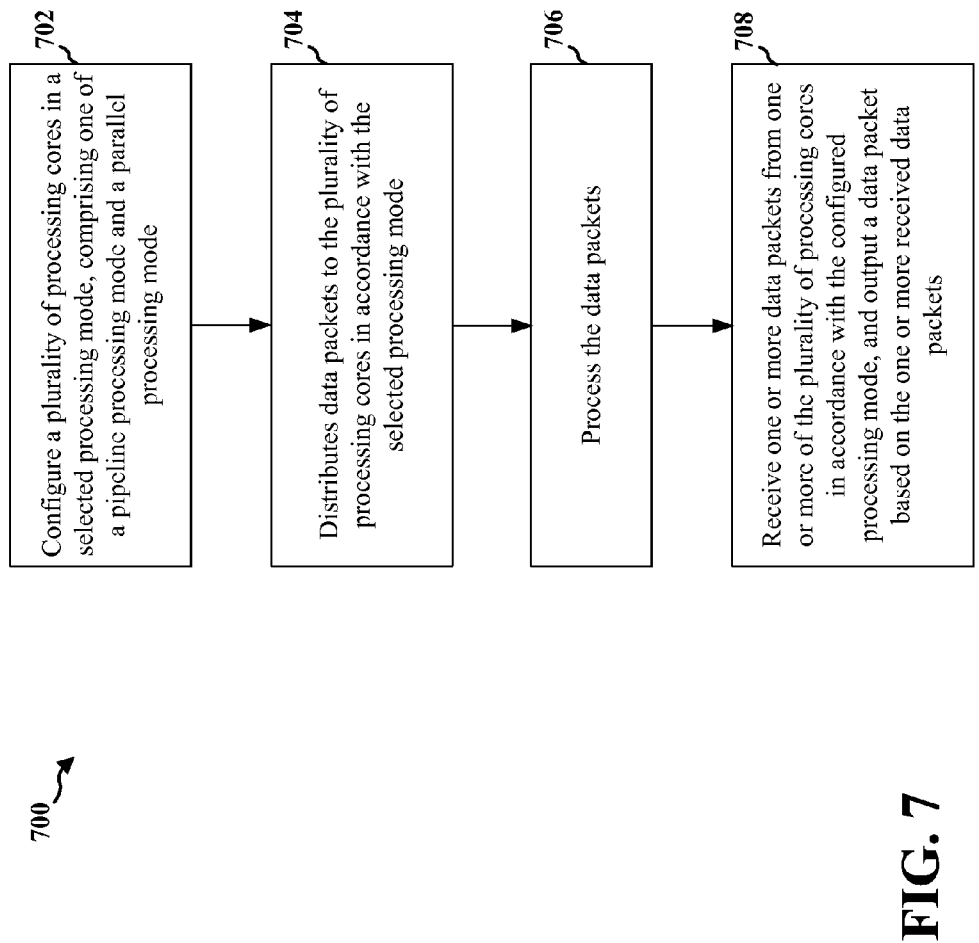
FIG. 7 is a flow chart of a method for processing data packets using a multicore network processor configurable between a pipeline processing mode and a parallel processing mode.

FIG. 7 is a flow chart of an example method 700 for processing data packets using a network processor configurable between a pipeline processing mode and a parallel processing mode. In 702, the network processor configures a plurality of processing cores in a selected processing mode. The selected processing mode may be one of a pipeline processing mode and a parallel processing mode.

For example, the network processor may configure the processing cores in either the pipeline processing mode or the parallel processing mode using FIFO interfaces and a processing mode mechanism or a means for configuring processing core. Such processing mode mechanism or a means for configuring processing core may be any corresponding structure, elements and/or features disclosed herein with reference to FIGS. 5 and 6, or equivalents thereof. To that end, the network processor may configure a plurality of switch elements, e.g., switches or multiplexers, to interconnect the processing cores to operate in either the pipeline processing mode or the parallel processing mode. The network processor may also or alternatively configure a fabric logic and bus to interconnect the processing cores to operate in either the pipeline processing mode or the parallel processing mode.

At 704, the network processor distributes data packets to the plurality of processing cores in accordance with the selected processing mode using the dispatcher or means for distributing packets. Such dispatcher or a means for distributing packets may by any corresponding structure, elements and/or features disclosed herein with reference to FIGS. 5 and 6, or equivalents thereof.

At 706, the network processor processes the data packets using the processing cores or means for processing. The packets are processed in accordance with known packet flow techniques. Such processing may include matching the data packet against flow entries of a flow table associated with a core processor, executing an instruction set on the packet if a flow entry match is found, and sending the packet to another processing core. Executing instructions may include modifying the packet and updating a match field, updating actions sets, and updating metadata. In the case of pipeline processing, these instructions may direct the packet to another processing core in the pipeline. In the case of parallel processing, these instructions may direct the packet to a reorder module.

At 708, the network processor outputs a data packet using a reorder module, or means for outputting packets. Such a reorder module, or means for outputting packets may by any corresponding structure, elements and/or features disclosed herein with reference to FIGS. 5 and 6, or equivalents thereof. In the case of pipeline processing, the reorder module receives a final data packet from the last processing core in the pipeline. In the case of parallel processing, the reorder module receives a packet from each of the processing cores in the parallel arrangement and sends the packets in a desired order.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A network processor, comprising:
    a plurality of processing cores to process data packets;
    a processing mode mechanism configurable to configure the processing cores between a pipeline processing mode and a parallel processing mode;
    a plurality of interfaces arranged with the plurality of processing cores, each interface including an input and an output;
    a dispatcher configured to distribute data packets to one or more of the interfaces; and a reorder module configured to receive processed data packets from the processing cores and to assemble or reorder the data packets in accordance with the processing mode, wherein the processing mode mechanism is configured to interconnect the plurality of interfaces, the dispatcher, the reorder module, and the plurality of processing cores to operate in the pipeline processing mode by coupling the input of a first of the plurality of interfaces to an output of a first of the plurality of processing cores and decoupling the input of a second of the plurality of interfaces from the dispatcher and the plurality of processing cores; and to operate in the parallel processing mode by coupling the input of the first of the plurality of interfaces to the dispatcher, coupling the input of the second of the plurality of interfaces to an output of the first of the plurality of processing cores, and coupling the output of the second of the plurality of interfaces to the reorder module.

2. The network processor of claim 1 wherein the processing mode mechanism comprises a plurality of switch elements configurable to interconnect the plurality of interfaces, the dispatcher, the reorder module, and the plurality of processing cores to operate in either the pipeline processing mode or the parallel processing mode.

3. The network processor of claim 2 wherein the switch elements comprise one or both of switches and multiplexers.

4. The network processor of claim 1 wherein the processing cores are configurable into a plurality of processing core groups, each group having an associated processing mode mechanism configurable to configure the processing cores within a group between a pipeline processing mode and a parallel processing mode.

5. A network processor, comprising:
means for processing data packets comprising a plurality of processing cores;
means for configuring the means for processing between a pipeline processing mode and a parallel processing mode;
a plurality of interfaces arranged with the processing cores, each interface including an input and an output;
a dispatcher configured to distribute data packets to one or more of the interfaces; and
a reorder module configured to receive processed data packets from the processing cores and to assemble or reorder the data packets in accordance with the processing mode,
wherein the means for configuring the means for processing is configured to interconnect the plurality of interfaces, the dispatcher, the reorder module, and the plurality of processing cores to operate in the pipeline processing mode by coupling the input of a first of the plurality of interfaces to an output of a first of the plurality of processing cores and decoupling the input of a second of the plurality of interfaces from the dispatcher and the plurality of processing cores; and to operate in the parallel processing mode by coupling the input of the first of the plurality of interfaces to the dispatcher, coupling the input of the second of the plurality of interfaces to an output of the first of the plurality of processing cores, and coupling the output of the second of the plurality of interfaces to the reorder module.

6. The network processor of claim 5 wherein:
the means for configuring comprises a plurality of switch elements configurable to interconnect the plurality of interfaces, the dispatcher, the reorder module, and the plurality of processing cores to operate in either the pipeline processing mode or the parallel processing mode.

7. The network processor of claim 6 wherein the switch elements comprise one or both of switches and multiplexers.

8. The network processor of claim 5 wherein the plurality of processing cores are configurable into a plurality of processing core groups, each group having an associated means for configuring the processing cores within a group between a pipeline processing mode and a parallel processing mode.

9. A non-transitory computer-readable medium storing computer executable code executable by a network processor, the network processor comprising a plurality of processing cores and a processing mode mechanism, a plurality of interfaces arranged with the plurality of processing cores, each interface including an input and an output, a dispatcher configured to distribute data packets to one or more of the interfaces, and a reorder module configured to receive processed data packets from the processing cores and to assemble or reorder the data packets in accordance with a selected processing mode, the code when executed in the network processor, causes the processing mode mechanism to:

configure the plurality of processing cores in the selected processing mode, the selected processing mode comprising one of a pipeline processing mode and a parallel processing mode, wherein the processing mode mechanism is configured to interconnect the plurality of interfaces, the dispatcher, the reorder module, and the plurality of processing cores to operate in the pipeline processing mode by coupling the input of a first of the plurality of interfaces to an output of a first of the plurality of processing cores and decoupling the input of a second of the plurality of interfaces from the dispatcher and the plurality of processing cores; and to operate in the parallel processing mode by coupling the input of the first of the plurality of interfaces to the dispatcher, coupling the input of the second of the plurality of interfaces to an output of the first of the plurality of processing cores, and coupling the output of the second of the plurality of interfaces to the reorder module.

10. The non-transitory computer-readable medium of claim 9 wherein the code, when executed in the network processor, causes the processing mode mechanism to configure a plurality of processing cores in a selected processing mode, by configuring a plurality of switch elements to interconnect the plurality of interfaces, the dispatcher, the reorder module, and the plurality of processing cores to operate in either the pipeline processing mode or the parallel processing mode.

11. The non-transitory computer-readable medium of claim 10 wherein the switch elements comprise one or both of switches and multiplexers.

12. The network processor of claim 1, wherein the plurality of interfaces comprise first-in-first-out interfaces.

13. The network processor of claim 5, wherein the plurality of interfaces comprise first-in-first-out interfaces.

14. The non-transitory computer-readable medium of claim 9, wherein the plurality of interfaces comprise first-in-first-out interfaces.

* * * * *